United States Patent
Veariel et al.

(10) Patent No.: US 7,632,086 B2
(45) Date of Patent: Dec. 15, 2009

(54) MELT FRACTURE REDUCTION

(75) Inventors: Thomas Redden Veariel, Houston, TX (US); Costas George Gogos, Wyckoff, NJ (US); David Burton Todd, West Windsor, NJ (US); Bainian Qian, Newark, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 311 days.

(21) Appl. No.: 10/723,389

(22) Filed: Nov. 25, 2003

(65) Prior Publication Data

US 2005/0074609 A1  Apr. 7, 2005

Related U.S. Application Data

(60) Provisional application No. 60/508,729, filed on Oct. 3, 2003.

(51) Int. Cl.
*B29C 47/00* (2006.01)
(52) U.S. Cl. .................. 425/378.1; 425/382 R
(58) Field of Classification Search ............. 425/378.1, 425/382 R, 382.2, 381.2, 463; 264/176.1, 264/472, 486
See application file for complete search history.

(56) References Cited

U.S. PATENT DOCUMENTS

| | | | | |
|---|---|---|---|---|
| 3,029,474 A | * | 4/1962 | Hermann et al. ......... 264/209.1 |
| 3,427,685 A | * | 2/1969 | Gove et al. .................. 425/464 |
| 3,461,496 A | * | 8/1969 | Winstead ..................... 425/4 R |
| 3,516,120 A | * | 6/1970 | Braun et al. .................. 425/67 |
| 3,521,325 A | * | 7/1970 | Schippers ....................... 425/3 |
| 3,749,536 A | * | 7/1973 | Remscheid et al. ......... 425/190 |
| 3,819,777 A | * | 6/1974 | Vermeerbergen ........... 264/40.6 |
| 4,123,207 A | * | 10/1978 | Dudley ......................... 425/67 |
| 4,178,067 A | * | 12/1979 | Johnson et al. ............... 385/95 |
| 4,184,832 A | * | 1/1980 | Cuff ............................ 425/308 |
| 4,225,547 A | * | 9/1980 | Okita .......................... 264/127 |
| 4,300,877 A | * | 11/1981 | Andersen ...................... 425/67 |
| 4,332,543 A | * | 6/1982 | Fulton et al. ................. 425/461 |
| 4,378,964 A | * | 4/1983 | Wolfe, Jr. .................... 425/463 |
| 4,678,423 A | * | 7/1987 | Bertolotti .................... 425/311 |
| 4,752,196 A | * | 6/1988 | Wolfe, Jr. ..................... 425/67 |
| 4,764,100 A | * | 8/1988 | Lambertus ................... 425/67 |
| 4,808,561 A | | 2/1989 | Welborn, Jr. | |
| 4,830,595 A | * | 5/1989 | Bentivoglio et al. ......... 425/143 |
| 4,934,916 A | * | 6/1990 | Lambertus ................... 425/67 |
| 5,017,714 A | | 5/1991 | Welborn, Jr. | |
| 5,055,438 A | | 10/1991 | Canich | |

(Continued)

FOREIGN PATENT DOCUMENTS

EP    334 829    9/1989

(Continued)

OTHER PUBLICATIONS http://en.wikipedia.org/wiki/Polytetrafluoroethylene.*

*Primary Examiner*—Philip C Tucker
*Assistant Examiner*—Dimple N Bodawala

(57) ABSTRACT

Melt fracture is reduced, without the necessity of polymer processing-aid additives specifically designed to alleviate exit region surface melt fracture phenomenon, by heating at least a portion of the die through which the polymer is extruded. The die exit region is maintained at a temperature above the bulk melt temperature of the polymer extruded through the die exit hole.

41 Claims, 6 Drawing Sheets

U.S. PATENT DOCUMENTS

| | | | |
|---|---|---|---|
| 5,064,801 A | 11/1991 | Juntgen et al. | |
| 5,089,200 A | 2/1992 | Chapman | 264/127 |
| 5,124,418 A | 6/1992 | Welborn, Jr. | |
| 5,153,157 A | 10/1992 | Hlatky et al. | |
| 5,192,543 A * | 3/1993 | Irvin et al. | 425/378.1 |
| 5,204,045 A * | 4/1993 | Courval et al. | 264/323 |
| 5,272,236 A | 12/1993 | Lai et al. | |
| 5,278,272 A | 1/1994 | Lai et al. | |
| 5,324,800 A | 6/1994 | Welborn, Jr. et al. | |
| 5,395,231 A * | 3/1995 | Maejima | 425/466 |
| 5,562,931 A * | 10/1996 | Takeuchi | 425/207 |
| 5,611,983 A | 3/1997 | Ma et al. | |
| 5,714,173 A * | 2/1998 | Matsuo | 425/67 |
| 5,741,531 A | 4/1998 | Kowalski et al. | 425/144 |
| 6,017,991 A | 1/2000 | Drummond et al. | 524/451 |
| 6,187,397 B1 | 2/2001 | Grangette | 428/34.9 |
| 6,220,843 B1 * | 4/2001 | Allen | 425/7 |
| 6,220,847 B1 * | 4/2001 | Yoshida et al. | 425/313 |
| 6,376,410 B1 | 4/2002 | Burkhardt et al. | |
| 6,380,122 B1 | 4/2002 | Kuchta et al. | |
| 6,409,491 B1 * | 6/2002 | Leffew et al. | 425/67 |
| 6,474,969 B1 * | 11/2002 | Ready et al. | 425/67 |
| 6,514,062 B2 * | 2/2003 | Ishida | 425/67 |
| 6,552,129 B2 | 4/2003 | Babb et al. | 525/194 |
| 6,595,765 B1 * | 7/2003 | Lengerich et al. | 425/131.1 |
| 6,638,045 B2 * | 10/2003 | Yoshii et al. | 425/67 |
| 6,976,834 B2 * | 12/2005 | Knight et al. | 425/311 |
| 2003/0008026 A1 | 1/2003 | Knight et al. | 425/67 |

FOREIGN PATENT DOCUMENTS

| | | |
|---|---|---|
| EP | 630 996 | 12/1994 |
| EP | 728796 | 8/1996 |
| GB | 755738 | 8/1956 |
| GB | 990273 | 4/1965 |
| GB | 1 362 145 | 7/1974 |
| JP | 58217327 A * | 12/1983 |
| JP | 62060626 A * | 3/1987 |
| JP | 4-100807 | 4/1992 |
| WO | WO 9405482 A1 * | 3/1994 |
| WO | WO 96/11960 | 4/1996 |
| WO | WO 96/11961 | 4/1996 |
| WO | WO 01/72873 | 10/2001 |
| WO | WO 01/98409 | 12/2001 |

* cited by examiner

MELT FRACTURE REDUCTION

CROSS-REFERENCE TO RELATED APPLICATIONS

The present application claims the benefit of U.S. Provisional Application No. 60/508,729, filed Oct. 3, 2003, said application hereby incorporated by reference.

FIELD OF THE INVENTION

The invention relates to a method and apparatus for the extrusion of polymers to reduce extrudate distortion and/or surface roughness when processed through a die, and to extrudates, particularly pellets, produced using the method and apparatus.

BACKGROUND OF THE INVENTION

Many resins, such as polymers comprising polyethylene, have historically been vulnerable to polymer extrudate distortion and surface roughness, notably "shark skin", when subjected to high velocity through resin shaping devices. Such phenomena, referred to herein as exit region surface melt fracture, or "SMF", are seen to occur in a variety of instances, including without limitation, dies for pelletizing, sheeting, or blown film. In conventional resin shaping devices such as die-based, underwater pelletizers, SMF can be the source of several downstream processing problems, such as polymer fines generation, pellet dryer fouling, poorly dewatered pellets, decreased pellet bulk density, poor bulk solids bin flow, physical segregation when mixed with other components in downstream processing, and non-uniform, defective surface, finished polymer parts.

The aforementioned phenomena affects some resins more than others. As an example, LLDPE resins are typically produced using either a titanium-based, Zielger-Natta (Z/N) catalyst or Group IVB-based (e.g., Zr or Ti) metallocene catalyst. It has been found that metallocene-catalyzed LLDPE ("mLLDPE") typically will undergo SMF at shear stress levels roughly 20% lower than their Z-N-type counterparts. Generally, LLDPE resins (the term used herein to refer to both Z/N and metallocene-catalyzed resins unless otherwise specified) with a Melt Index less than or equal to about 1.0 dg/min (ASTM Method D-1238, Procedure B), are observed to be particularly susceptible to SMF.

Additives designed to be polymer processing aids (PPA) have been developed with the specific intent of reducing or eliminating the polymer SMF phenomenon, and it is conventional to add such additives as a matter of course. For instance, U.S. Pat. No. 6,187,397 suggests the use of fluorinated elastomers as processing aids "in the usual proportions . . . generally of the order of 500 ppm". See also, for instance, U.S. Pat. Nos. 6,552,129; 6,017,991; and 5,089,200.

PPAs have proven somewhat useful to the secondary manufacturer, e.g., the film processor. However, the primary polymer manufacturer, i.e., the polymer processor, does not realize the same benefits PPA reduction of additive-induced SMF inhibition when processing the original polymer into pellet form in the conventional pelletizer. The incorporation of PPAs adds to the manufacturing cost of the product and may not be acceptable in the final product. Furthermore, the additive approach is ineffective in addressing the SMF phenomenon under commercial, high flow rate processing conditions, especially for mLLDPE resins.

Micro-scale roughness of the die capillary or die exit hole, die capillary material selection, and capillary geometry have been postulated as causes of SMF. These effects are called "microscale roughness effect" and may account for some of the variation and conflicting results reported in the open literature. While minor improvements may be achieved for those dies that have substantial defects by, for instance, polishing of the die orifice or capillaries, such improvements cannot substantially improve or eliminate SMF.

U.S. Pat. No. 6,474,969 B1 discloses a die and die assembly for use in association with an underwater pelletizer. The die has a coiled heating element described by the patentee as being upstream from (i.e., distal) the die exit hole (see FIG. 1 of the reference) which, according to the patent, reduces or eliminates polymer solidification within the die.

The present inventors have surprisingly discovered that heating the die hole wall near to or at (i.e., proximate) the exit surface reduces or eliminates exit region surface melt fracture in polymers extruded through a shaping device.

SUMMARY OF THE INVENTION

The invention is directed to a method and apparatus for the extrusion of material to reduce extrudate distortion and/or surface roughness from exit region surface melt fracture (collectively "SMF") when processed through a shaping orifice.

In an embodiment the material is a polymer and the shaping orifice is a die.

In an embodiment, the method comprises heating the die opening wall near or at the exit surface to reduce or eliminate exit region surface melt fracture in polymers extruded through a die.

In another embodiment, the apparatus comprises a die wherein at least a portion of the die opening capillary wall at or near the exit is heated.

In yet another embodiment, the invention relates to a process that does not require the use of polymer processing-aid additives to help alleviate the exit region surface melt fracture phenomenon.

In still another embodiment, a lower-viscosity layer of polymer material, relative to the bulk polymer characteristic passing through the die, is created by use of a heater to locally heat the die wall and the polymer layer immediately in contact with the wall. In a preferred embodiment an insulating material is provided between the die material and the heater(s) and/or between the die opening and the cooling media into which the polymer is extruded In yet still another embodiment, a device is provided to allow retrofitting of conventional die apparatus in order to achieve the objectives of the present invention.

Moreover, an embodiment includes the polymer extrudate, particularly pellets, produced by the apparatus and processes according to the present invention.

Accordingly, it is an object of the present invention to provide a method and apparatus to reduce or eliminate SMF in resin extrudate. It is further an object to provide a method and apparatus to provide pellets with no visible SMF.

These and other objects, features, and advantages will become apparent as reference is made to the following detailed description, preferred embodiments, examples, and appended claims.

DETAILED DESCRIPTION

Figure 1:
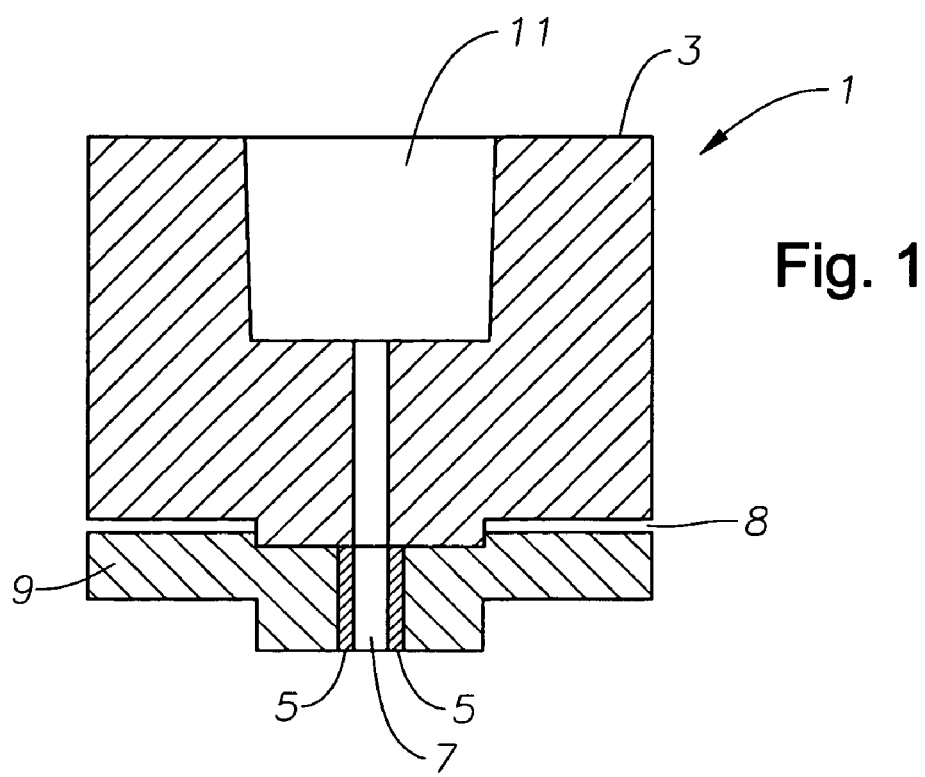
FIG. 1 illustrates an embodiment of the invention showing the location of a heater according to the present invention.

The present invention is directed to an apparatus and method for reducing or eliminating die-related surface melt fracture, herein referred to collectively as SMF, in a material by providing, at or near the exit orifice of a device through which the material moves, a means for heating at least the surface layer of said material exiting said orifice. In an embodiment the surface layer material is heated to a temperature above the exiting bulk melt temperature of said material proximate said exit orifice. As used herein, the term bulk temperature means the temperature that would be measured at a particular cross-section of flow if the flow at that cross-section were collected in a cup and thoroughly mixed. Cup temperature as used herein is the bulk temperature measured at the resin shaping exit (e.g., die exit, injection nozzle, and the like). This definition of cup temperature is intended to be consistent with the Third Edition of Whittington's Dictionary of Plastics (1993).

In an embodiment the material is a polymer and the orifice is a die.

According to an embodiment of the invention, exit region surface melt fracture is reduced, without the use of polymer processing-aid additives, by heating at least a portion of the die through which the polymer is extruded. In a preferred embodiment the portion of the die heated is near or at the exit point of the polymer from the die, i.e., proximate the die exit opening In an embodiment, a thin layer of insulation material is provided between the die exit and the cooling media, as described in detail below.

In a preferred embodiment, a finite length of the die opening wall near or at the exit surface is heated to a temperature above the extruding product bulk melt temperature, i.e., the cup temperature In another preferred embodiment at least a portion of the die is heated to a temperature about 30° C. above the extruding bulk melt temperature of the resin being extruded, preferably about 30-170° C. above the extruding product bulk melt temperature.

In still another embodiment, a rheological modification is caused in the polymer layer in contact with the die capillary wall by means of heat. In an example of such a modification, a lower-viscosity layer of polymer material, relative to the bulk polymer characteristic passing through the die, is created by use of a heater to locally heat (or superheat) the die wall and the polymer layer immediately in contact with the wall. As further described below, in an embodiment the die wall material may be defined by the heater itself, as in a cartridge heater having a passage drilled through it, or in another embodiment the heaters may be placed behind and proximate the die wall material defining the extrusion passage.

In a preferred embodiment the bulk temperature of the polymer stream is relatively unchanged due to the very brief residence time while in contact with the wall-layer polymer. In another preferred embodiment the heated zone only needs to be over a fraction of the total length of the die proximate the opening, but more preferably including the end zone of the portion of the opening closest to the die opening exit, allowing for an optional layer of insulation material. As used herein, the term "insulation" means thermally and electrically insulating, unless otherwise specified. Examples of such materials are given hereinbelow.

Another embodiment includes an extrudate formed by a shaping device, preferably a pellet formed by a pelletizer, comprising a polymer composition comprising a polyolefin and which may or may not further comprise a polymer processing aid, wherein said extrudate or pellet has no visible (to the unaided eye) die-exit surface melt fracture. In particular, there are numerous PPAs based on fluoropolymers and thus in another embodiment the extrudate or pellet comprises a polymer composition including a polyolefin and not containing a fluoropolymer, wherein said extrudate or pellet has no visible die-exit surface melt fracture. In the latter example, additives for reasons other than die-exit surface melt fracture—for instance, antistatic, slip agents, and the like—may be added provided they are not fluoropolymers.

In a preferred embodiment, the pellet consists essentially of a polymer composition not containing a fluoropolymer or more generally not containing a polymer processing aid and a mLLDPE having a Melt Index less than or equal to about 2.0 dg/min, or in another embodiment less than or equal to about 1.0 dg/min, as measured by ASTM Method D-1238, Procedure B, wherein said pellet has no visible die-exit surface melt fracture.

While the benefits of the invention can be achieved using numerous shaping devices, particular advantages are achieved using pelletizers such as underwater pelletizers, strand pelletizers, water-ring pelletizers.

In strand pelletizers, a molten material leaves the extruder in the form of strands which enter a cooling bath. After exiting the cooling bath, the strand of material enters a cutter. The cutter may involve a metal lip over which an end of the strand of material hangs until the end is cut off by a rotating blade.

In underwater pelletizers, the extrudate exits through openings in a die face which is underwater. Small bits or "drops" of extrudate are cut off by rotating knife blades which have knife edges in contact with the die face. In this regard, cooling water is circulated through a cooling chamber which encloses the die face and the knife blades such that water flows over the die face and the knife blades.

In water-ring pelletizers, the extrudate exits through die openings of a round die plate of the extruder. Small bits or "drops" of extrudate are cut off by rotating knife blades which have knife edges in contact with the die face. The molten extrudate "drops" are flung by the knife blade into a cylindrical curtain of water flowing outward around the circumference of the round die plate. When the extrudate hits the water the surface cools to form pellets which cool further as they flow down to a screen separator where most of the water is separated from the pellets.

More generally the present invention is applicable to any device wherein a material exits an orifice, such as slit die for extruding a sheet of film, and any shaping device such as, without limitation, those having an annular opening for extruding blown film, and the like. The advantages of the present invention are particularly realized in the case where the material exits the orifice in a molten state.

The invention is particularly suitable for resin materials including hydrocarbon resins, rosin resins, terpene resins, and the like. In a preferred embodiment the resin is a polyolefin, or blend of polyolefins, which may further include another material. The resins in general may be used for numerous end uses, such as for films, molded articles, adhesives, and the like. As such, the composition may comprise a resin and suitable additives (while specifically excluding polymer processing aids designed to reduce or eliminate SMF) depending on the end use. In a preferred embodiment of the present invention the resin is a film-forming resin.

In another preferred embodiment, the composition comprises a polyolefin composition, more preferably selected from polyethylene, polypropylene, copolymers and terpolymers of polyethylene and polypropylene, and mixtures thereof.

In a more preferred embodiment, the composition may comprises one or more of the various types of polyethylenes known in the art, including low density polyethylene, linear low density polyethylene, medium density polyethylene, and very low density polyethylene.

Low density polyethylene ("LDPE") can be prepared at high pressure using free radical initiators, and typically has a density in the range of 0.916-0.940 $g/cm^3$. LDPE is also known as "branched" or "heterogeneously branched" polyethylene because of the relatively large number of long chain branches extending from the main polymer backbone. Polyethylene in the same density range, i.e., 0.916 to 0.940 $g/cm^3$, which is linear and does not contain long chain branching is also known; this "linear low density polyethylene" ("LLDPE") can be produced with conventional Ziegler-Natta catalysts or with metallocene catalysts. Relatively higher density LDPE, typically in the range of 0.928 to 0.940 $g/cm^3$, is sometimes referred to as medium density polyethylene ("MDPE"). Polyethylenes having still greater density are the high density polyethylenes ("HDPEs"), i.e., polyethylenes having densities greater than 0.940 $g/cm^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 $g/cm^3$, typically 0.890 to 0.915 $g/cm^3$ or 0.900 to 0.915 $g/cm^3$.

All of the aforementioned materials are suitable in the processes according to the present invention and thus pellets according to the invention may be comprised of these compositions.

In an embodiment the polyolefin may be a homopolymer, or it may be a copolymer. Included in the definition of copolymer for the purposes of this invention are terpolymers and even higher order resins having a greater number of different monomers incorporated into the polymer.

In the case of polyethylene, the copolymers may be, for example, polyethylene and one or more comonomers selected from, as non-limiting examples, carbon monoxide, vinyl esters such as vinyl acetate, alkyl acrylates or methacrylates, maleic anhydride or glycidyl (meth)acrylate, and the like. Other suitable comonomers include alpha-olefins, examples of which are 1-butene, 1-pentene, 1-hexene, 1-octene, 1-nonene, 1-decene, 1-unidecene, 1-dodecene and the like, as well as 4-methyl-1-pentene, 4-methyl-1-hexene, 5-methyl-1-hexene, vinylcyclohexene, styrene and the like.

The apparatus according to the present invention may also be described as being useful with any thermoplastic polymer including homopolymers and copolymers with narrow and comonomer distribution (narrow and broad, including bimodal, molecular weight distribution) such as copolymers of ethylene with one or more alpha olefin ($C_3$ to $C_{20}$), ethylene copolymers with unsaturation (EPDM or EODM, that is ethylene-propylene-diene or ethylene-octene-diene), or other polymers such as mentioned above (e.g., LDPE), ethylene vinyl acetate copolymers, ethylene acrylic acid copolymers, styrene based block copolymers (SBS, SEBS, SIS and the like, that is styrene/butadiene/styrene, styrene/ethylene/butylene/styrene (hydrogenated SEBS), styrene/isoprene/styrene and the like), substantially random interpolymers of at least one alpha-olefin with at least one vinyl aromatic or hindered vinyl aliphatic comonomer including ethylene-styrene interpolymers, syndiotatic polystyrene, atactic polystyrene, hydrogenated polyvinyl cyclohexene, PET (poly(ethylene terephthalate)), PBT (polybutylene terephthalate), PEN (polyethylene naphthalate), polylactic acid, thermoplastic polyurethanes, polycarbonate, nylon, poly(methyl methacrylates), ABS (acrylonitrile/butylene/styrene), polysulfone, polyphenylene oxide, polyphenylene sulfides, polyacetal and polyvinyl chloride.

In an embodiment, the material may also be selected from or include substantially linear ethylene polymers (SLEPs), which are homogeneous polymers having long chain branching, such as disclosed in U.S. Pat. Nos. 5,272,236 and 5,278,272; they may be selected from polyolefin elastomers (POEs) commercially available from DuPont Dow Elastomers LLC; and they may be selected from polyolefin plastomers (POPs) commercially available from The Dow Chemical Company.

In another embodiment, the composition is (i) a copolymer of ethylene and of at least one vinyl ester of a saturated carboxylic acid containing 2 to 6 carbon atoms, (ii) a copolymer of ethylene and of at least one alkyl acrylate or methacrylate in which the alkyl group contains from 1 to 10 carbon atoms, (iii) the above copolymers further copolymerized with maleic anhydride or glycidyl (meth)acrylate, or (iv) the mixtures of at least two of the above mentioned copolymers.

In still another embodiment, the composition comprises as a comonomer a vinyl acetate (i.e., EVA), preferably EVA consisting of 10-40 wt. %, more preferably 12-28 wt. %, and even more preferably 15-25 wt. % vinyl acetate units.

The polyolefin composition may also comprise polypropylene, which may be a homopolymer of polypropylene or a random or block copolymer of polypropylene, or blends thereof. The homopolymer may be atactic polypropylene, isotactic polypropylene, syndiotactic polypropylene and blends thereof. Such blends may include so-called impact copolymers, elastomers, and plastomers, any of which may be physical blends or in situ blends of polypropylene and one or more polypropylene copolymers. Preferred comonomers in the polypropylene copolymers include monomers selected from ethylene and $C_4$ to $C_{20}$ alpha-olefin derived units.

In an embodiment, the resin composition may be a mixture of various types of polyolefins, including a conventional filmforming polyolefin such as polyethylene and/or polypropylene with a material not conventionally formed into a film by itself, such as an ethylene elastomers, which are polymers comprising ethylene and propylene. The composition may also comprise ionomers such as polyethylenes or ethylene copolymer ionomers. Numerous other resins are contemplated, such as polysytrene and polyolefins functionalized with borane monomers, sufonyl groups, and the like.

The polyolefin may be produced using any known catalyst system for producing polyolefins, e.g., Ziegler-Natta or metallocene catalysts, and can be made by, for instance, slurry (which may employ chromium-based catalysts), solution, or gas phase processes.

In a preferred embodiment the resin comprise polyolefin produced using a Ziegler-Natta catalyst and more preferred that the resin comprise polyethylene produced using a Ziegler-Natta catalyst.

It is still more preferred that the polyolefin be a metallocene-catalyzed polyolefin. As used herein, the term "metallocene catalyst" is defined to be at least one metallocene catalyst component containing one or more substituted or unsubstituted cyclopentadienyl moiety (Cp) in combination with a Group 4, 5, or 6 transition metal (M).

The metallocene catalyst precursors generally require activation with a suitable co-catalyst, or activator, in order to yield an "active metallocene catalyst", i.e., an organometallic complex with a vacant coordination site that can coordinate, insert, and polymerize olefins. The active catalyst systems generally includes not only the metallocene complex, but also an activator, such as an alumoxane or a derivative thereof (preferably MAO), an ionizing activator, a Lewis acid, or a combination thereof. Alkylalumoxanes are additionally suitable as catalyst activators The catalyst system is preferably supported on a carrier, typically an inorganic oxide or chloride or a resinous material such as polyethylene.

The aforementioned catalysts and processes are well known in the art, and are described in, for example, ZIEGLER CATALYSTS (Gerhard Fink, Rolf Mulhaupt and Hans H. Brintzinger, eds., Springer-Verlag 1995); Resconi et al., *Selectivity in Propene Polymerization with Metallocene Catalysts,* 100 CHEM. REV. 1253-1345 (2000); and I, II METALLOCENE-BASED POLYOLEFINS (Wiley & Sons, 2000), and numerous patents, such as WO 96/11961; WO 96/11960; U.S. Pat. Nos. 4,808,561; 5,017,714; 5,055,438; 5,064,802; 5,124,418; 5,153,157; 5,324,800; more recent examples are U.S. Pat. Nos. 6,380,122; and 6,376,410; and WO01/98409, and references cited therein.

In a more preferred embodiment the material exiting the orifice is metallocene-catalyzed linear low density polyethylene (mLLDPE) resin with a Melt Index less than or equal to about 2.0 dg/min, or in another more preferred embodiment less than or equal to about 1.0 dg/min (ASTM Method D-1238, Procedure B).

EXAMPLES

The following examples are meant to illustrate presently preferred embodiments of the present invention, wherein like numerals refer to like parts throughout. Numerous modifications and variations are possible, and it is to be understood that within the scope of the appended claims, the invention may be practiced otherwise than as specifically described herein.

Example 1

A single capillary extruder die 1 as shown in FIG. 1 was fabricated having a brass die body 3 modified so that a portion of the capillary is heated by a heating element 5 including the end zone of the capillary closest to the die opening 7 by means of die holder 9, also made of brass, which may be attached to the die with bolts (not shown). The heaters, having an inner diameter (ID) of 3.2 mm and a length of L=15.2 mm are cartridge heaters commercially available from Watlow GmbH of Germany. The cartridge heaters are concentric with the extrusion orifice pattern, and form the capillary wall proximate the capillary exit, to maintain uniform heat around the entirety of the orifice exit. Slots in the die holder 9 allow passage of electrical wire (not shown), which are hooked up to a Variac to control voltage input and thus heat. A gasket or other sealing device, such as an adhesive, may be placed between body 3 and die holder 9 at the optional gap indicated by numeral 8, also shown in FIGS. 2-4

Polymer enters the extruder die 1 "upstream" of the die part at the point indicated by numeral 11 and exits at die opening 7. The die capillary closest to the die opening 7 was heated to various temperatures, by means of the electric heater 5, ranging from 245-372° C., or approximately 30-170° C. above the extruding product bulk melt temperature, over a wide range of polymer flow rates that would be representative of or exceed commercial operations extrusion rates. Successful runs were achieved when the heater temperature and flow rates were such that the bulk temperature is minimally affected. Various types of commercially available mLLDPE polymer products (detailed below) are extruded through the die apparatus in this manner. A water chamber was not used.

It is found that this die-tip heating technique is capable of allowing commercially-available EXCEED™ 350D65, a PPA-containing mLLDPE resin, to extrude through a 0.125-inch die capillary at 24 kg/h without any visible or tactile evidence of SMF. This flow rate exceeds three times the normal flow rate threshold for SMF for these resins at these processing conditions. The flow rates described herein are per hole unless otherwise noted.

Example 2

The above experiment was repeated using commercially available EXCEED™ 350D60 mLLDPE, similar to the mLLDPE used in Example 1 except having no PPA. Very surprisingly, no surface irregularities are observed by visual or tactile inspection of the extrudate even at flow rates up to 28 kg/hr.

The results regarding the elimination of SMF using mLLDPE without PPA were obtained, however, only for the case where the temperature of the die exit ($T_{die\ exit}$) is greater than the temperature of the melt ($T_{melt}$) by about 30 to about 170° C.

Example 3

A commercial scale underwater pelletizing extruder having a water chamber and having multiple dies modified as in Examples 1 and 2, above, was next used to simulate a commercial scale run. The results achieved were not as good as those observed in the single capillary experiments. SMF was observed visually. Without wishing to be bound by theory, it is believed that the cooling effect of the water on the die exit corners had enough of a negative impact on the superheating effect that SMF is observed at substantially lower flow rates.

Examples 4-6

Figure 2:
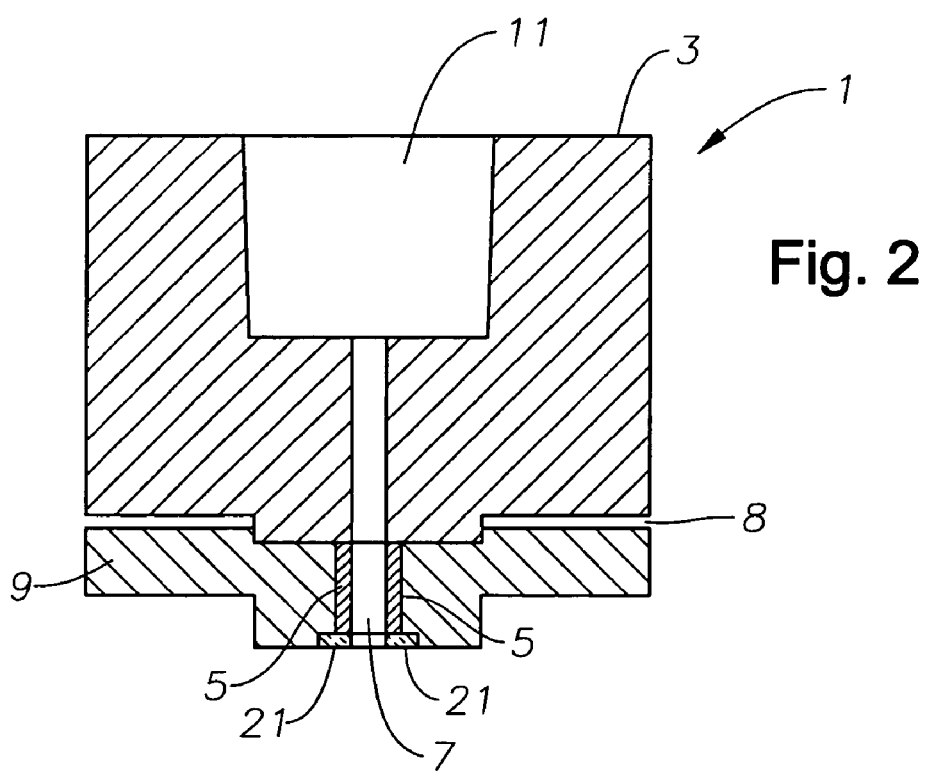
FIG. 2 illustrates an embodiment of the invention showing the location of a heater and insulation according to the present invention.

A single capillary extruder die 1 was then modified to better insulate the die exit from the cooling water influence. In Example 4, the die opening is modified to provide for an insulating insert 21, which is also concentric with the die capillary, and which forms part of the capillary wall as shown in FIG. 2. Otherwise the capillary extruder die was identical to FIG. 1, as indicated by like numerals.

Figure 3:
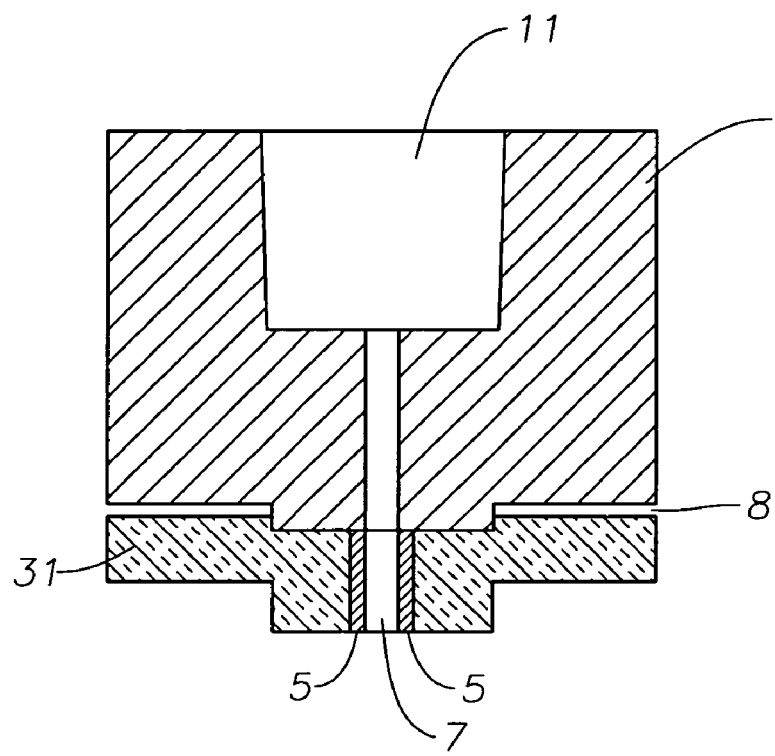
FIG. 3 illustrates another embodiment of the invention with a heater and insulation.

In Example 5, an insulating layer 31 is placed around the heating element 9 to lessen heat losses to other parts of the die, as shown in FIG. 3. Again, other parts of the extruder die are identical to FIG. 1, as indicated by like numerals.

In Example 6 (FIG. 4), the die capillary 41 is shortened relative to Examples 4 and 5, a die insert 43 is provided in die holder 9, comprising heater 5 and insulation 45, the heater and insulation concentric with the die capillary 41, as in Example 5, to provide heat to the die exit 7. An additional chamber 47 is provided to further telescope the polymer into capillary 41. A cavity 49 is provided for a thermocouple to monitor the temperature of the die.

Figure 4:
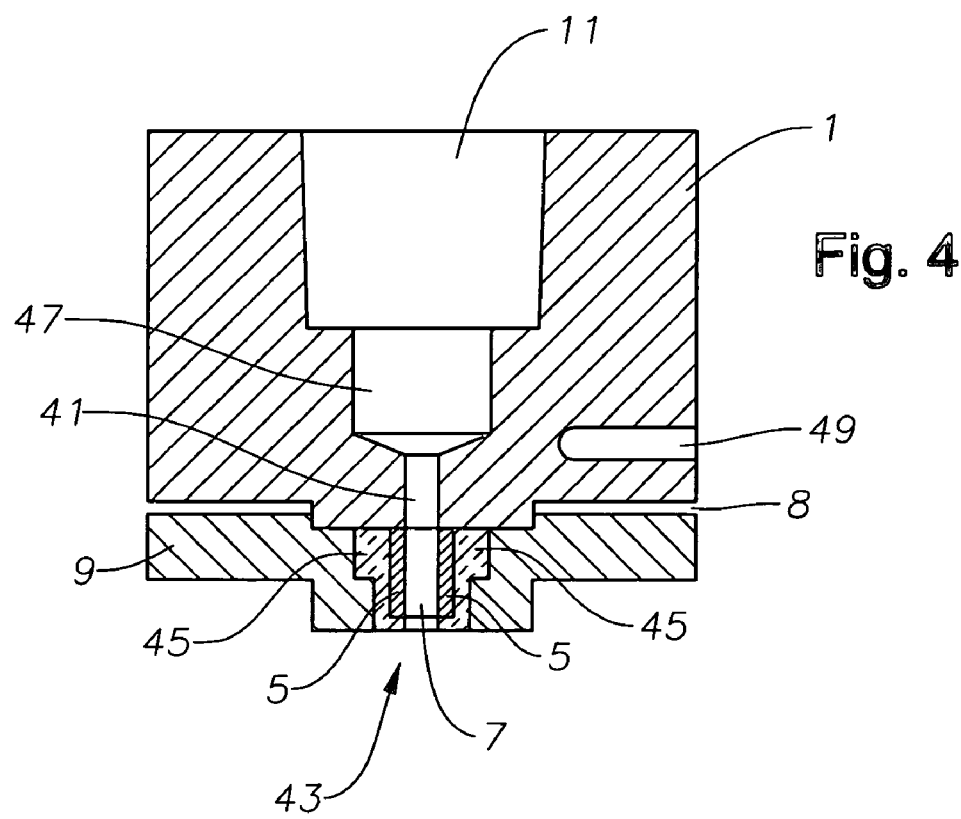
FIG. 4 illustrates another embodiment of the invention with a heater, insulation and cavity for a thermocouple.

The insulating layer method shown in FIGS. 2-4 using PBI as insulating material was found to duplicate successful lab runs with the single die using a capillary flow rate per hole of up to 24 kg/hr by adjusting the capillary wall temperature up to 390° C. with a bulk polymer melt temperature of 240° C. using the same mLLDPE resins with MI=1 dg/min and a density of 0.917 g/cc, with and without PPAs.

The insulating layer or insert may be, for instance, PBI polybenzimidazole) as in Examples 4-6, above, but it may also be other suitable material that is an insulator such as other high temperature plastics or a machineable ceramic, preferably a material having a low thermal conductivity at room temperature, relative to the die material and/or the quenching or cooling media encountered by the extrudate. In a more preferably embodiment, the material will have a thermal conductivity roughly 1% of the thermal conductivity of steel, or less.

It will also be appreciated by one of skill in the art in possession of the present disclosure that heating means other than that used in the above examples may be used. For instance, coil heaters such as used in the aforementioned U.S. Pat. No. 6,474,969, which are separated from the capillary wall by die material, or cartridge heaters spaced around the capillary walls, may be used, provided that substantially uniform heat may be provided locally and proximate the die exit, whereby, in an embodiment, a lower viscosity layer of polymer material, relative to the bulk polymer characteristic passing through the die, is created proximate the die exit.

Example 7

Figure 5:
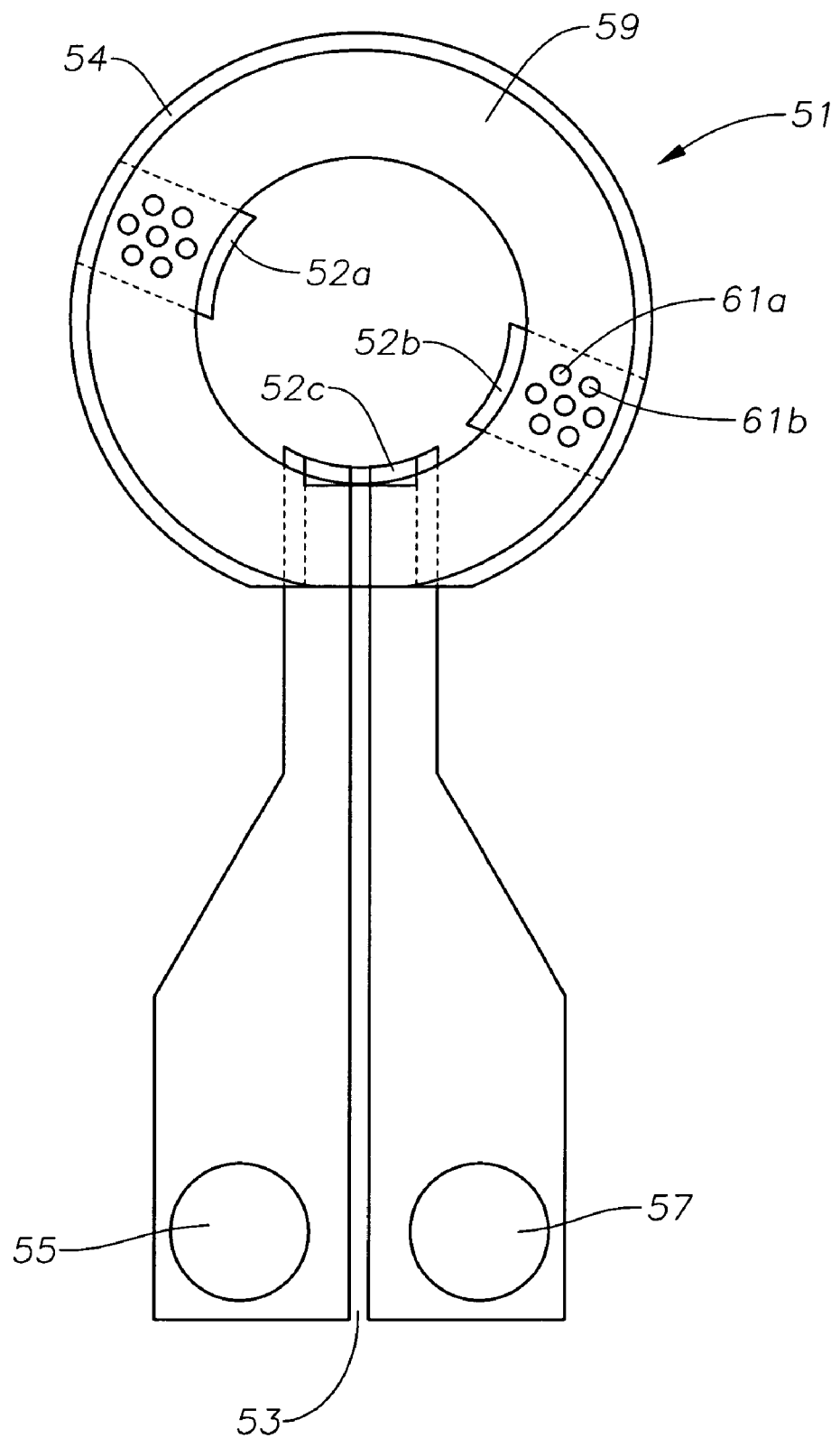
FIG. 5 illustrates a direct-heating die-ring particularly suitable as a retrofit part, which is an aspect of the present invention.

In another embodiment, a die-ring part 51 in FIG. 5 is fabricated, which is also a monolithic heater. There is a slit 53 in the die ring part between the two copper-electrodes 55 and 57, to which a voltage is applied. The current will flow from one electrode, through the die-ring 59, to the other electrode. The die ring was fabricated of Inconel coated on one side—the cutting side—with an insulation layer of zirconium oxide formed by physical vapor deposition. The zirconium oxide layer may be applied by other suitable means, such as a spray coating technique (e.g., plasma spraying). Since the die-ring is made of material with much higher resistivity (nearly 2 orders of magnitude higher than that of copper), the electric energy will be mainly dissipated into heat inside the die ring. The die ring may be made of other suitable materials, such as stainless steel, and the insulation coating may be of any suitable type, such as chromium oxide. Fourteen capillary holes 61a, 61b, etc. are formed to match the capillary holes of the cutting face of the extrusion device to which the die-ring 51 is attached, with the zirconium oxide coating facing outward and now becoming the cutting face, which may engage with the cutting blades. In the case where the capillary holes are formed prior to vapor deposition of the insulating layer, plugs may be place into the capillary holes to shield the capillary walls from the vapor deposition process. In a preferred embodiment, the insulation is polished sufficiently to allow the cutting blades of the pelletizer to ride on the plate with a minimum of friction.

Temperature tests showed that a die-ring 51 having uniform thickness resulted in higher temperatures in the inner diameter of the ring. To compensate, a die ring was fabricated having a taper to reduce the thickness of the die-ring progressively toward the inner diameter, while keeping the thickness around the capillary holes and electrodes unchanged in order to minimize sealing problems. The optimal ratio of inner thickness to outer thickness was found to be about 1.1 cm/1.5 cm. In this case, the taper was found to be approximately 20 degrees from outer to inner diameter. It was observed that there was more intense heating (i.e., higher temperature) around the capillary holes, which is believed to be a significant advantage of the die-ring embodiment. However, with the aforementioned taper design, it is found that the temperature is very uniform among the holes between the inner and outer diameters, with a variation of no more than 10° C. within the operable temperature ranges studied.

FIG. 5 illustrates one embodiment of the invention, fabricated to retrofit existing die plate configurations. A part similar to die ring 51 may be fabricated to retrofit the SMF technology according to the present invention to many existing pelletizing die plate hole configurations, and it will be understood by those of skill in the art in possession of the present disclosure that numerous other designs are possible depending on the configuration of the shaping device.

As exemplified by FIG. 5, a plate can attach directly to the die cutting surface and contain a hole pattern that matches the retrofit die plates' capillary hole pattern. In FIG. 5, optional inner lip portions, such as defined by numerals 52a, 52b, 52c, and/or an outer lip portion, such as defined by numeral 54, may serve to retain the die ring part to the die surface by means of bolts, welding, adhesives, and the like. The apparatus according to this embodiment can be employed as a resistive or inductive heating technique to eliminate the need for individual cartridge heaters for each capillary in the die plate. The plate attaches directly to die cutting surface as a retrofit.

Figure 6:
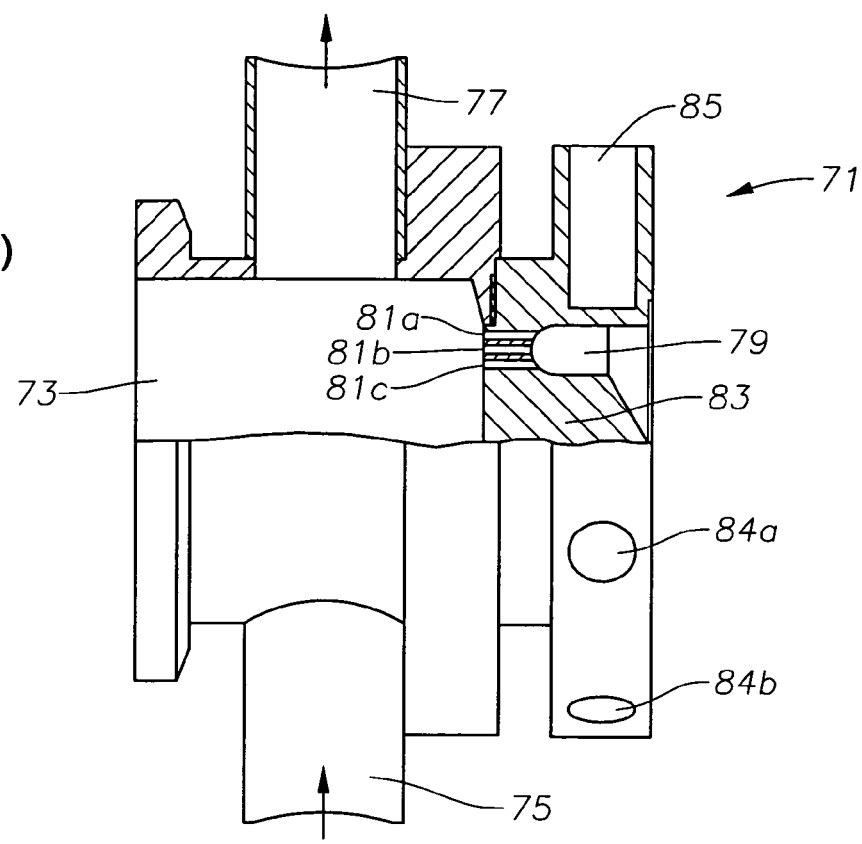
FIG. 6 illustrates a prior art pelletizer with a water chamber.
Figure 7:
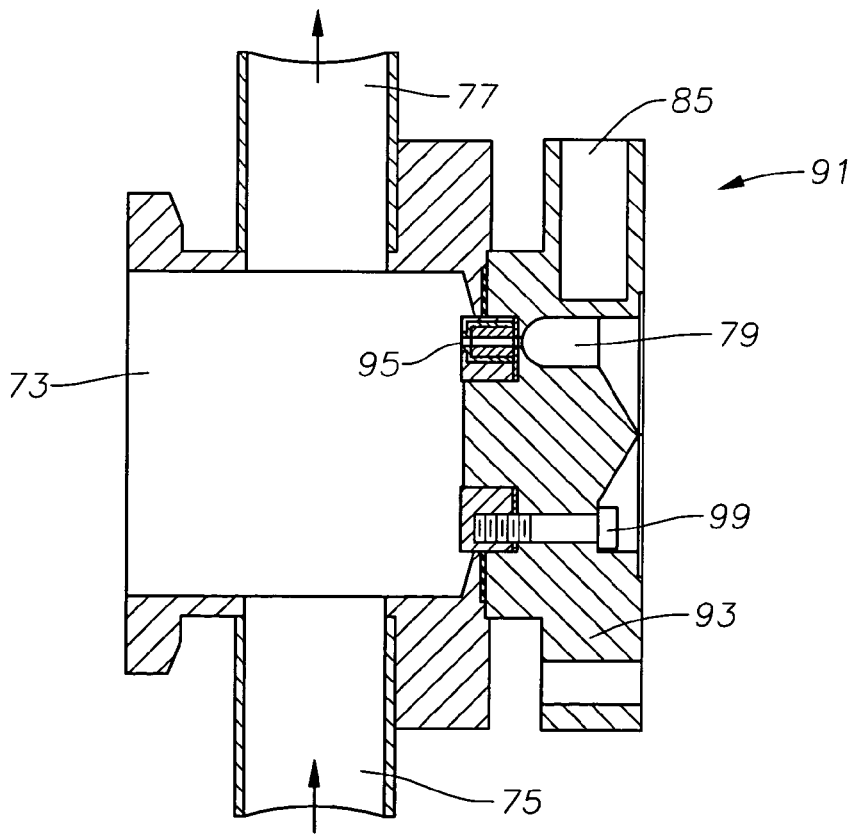
FIG. 7 illustrates an embodiment of a pelletizer modified according to the present invention.

A preferred embodiment of the present invention is illustrated in FIG. 7, with reference also to the prior art as illustrated in FIG. 6.

FIG. 6 illustrates a prior art underwater pelletizer 71 with water chamber 73 attached. The cutting blades are not shown for convenience of view. Water enters the water chamber 73 at entrance 75 and exits, along with the formed pellets, at exit 77. The polymer melt enters the channel 79 and exits out the several die orifices 81a, 81b, 81c (for convenience only three are shown; in practice there are typically many more orifices). Also for convenience of view, cutting blades engaging the exit of the orifices 81a, 81b, 81c are not shown. The die 83 is typically heated by means of optional cartridge heaters placed in cavity 85. The die plate may be heated by the optional die plate heaters to ordinary process temperatures and is typically only used to offset heat losses from the die assembly.

FIG. 7 illustrates an embodiment of an underwater pelletizer 91 according to the present invention, without the cutting blades shown for convenience of view. The arrangement of cutting devices would be readily apparent to one of skill in the art. Similar to FIG. 6, water enters at entrance 75 and exits, along with the pellets formed, at exit 77. As in the prior art, polymer melt enters channel 79 and exits out one or more die exits 95. The die plate 93 may be heated by means of a heater in cavity 85. The die exits, which may be removable, are modified according to the present invention. Die exit 95 is illustrated in detail in FIG. 8. The several exit orifices which typically will comprise the apparatus according to the invention, may be conveniently supplied by means of the die ring illustrated in FIG. 6 or similar devices, which would be then affixed to the die plate 93 by means of bolt 99. The entire die ring assembly is not illustrated in FIG. 8 for convenience of view, by rather may be seen in FIG. 10, discussed further below.

Figure 8:
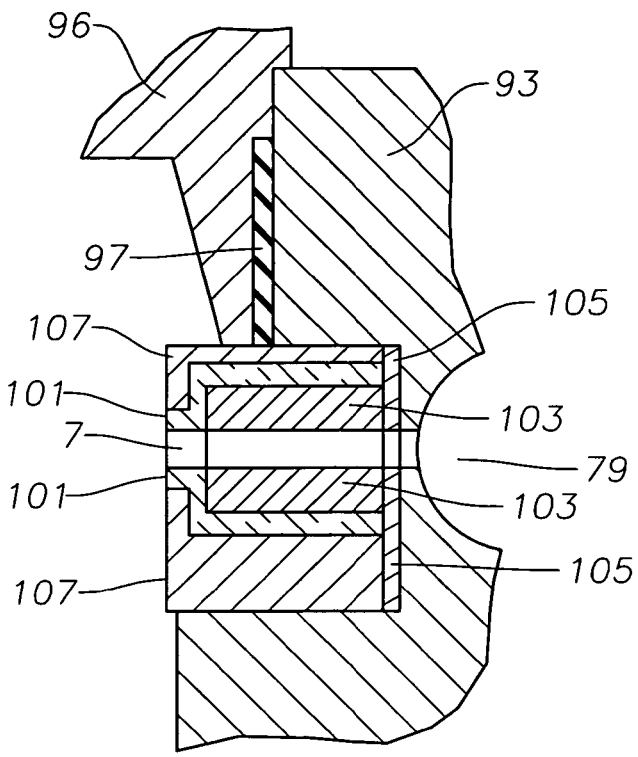
FIG. 8 illustrates an embodiment of the insert used in FIG. 7, including heater and insulation parts.

FIG. 8 shows a preferred embodiment of the invention. Die plate 93 and water box, illustrated by part 96, are the same as in FIG. 7. An insulation gasket, also present FIGS. 6 and 7, is illustrated by part 97. Polymer melt enters the capillary at channel 79 and exits downstream at orifice 7, as in previous figures. The removable assembly (95 in FIG. 7) comprises heater 103 and associated heater and plate front insulation 101, housed in the removable assembly 107 which may be made of the same material as the die plate 93. The assembly, concentric with the extrusion die capillary ending at opening 7, is insulated from the die plate 93 by gasket 105.

Figure 9:
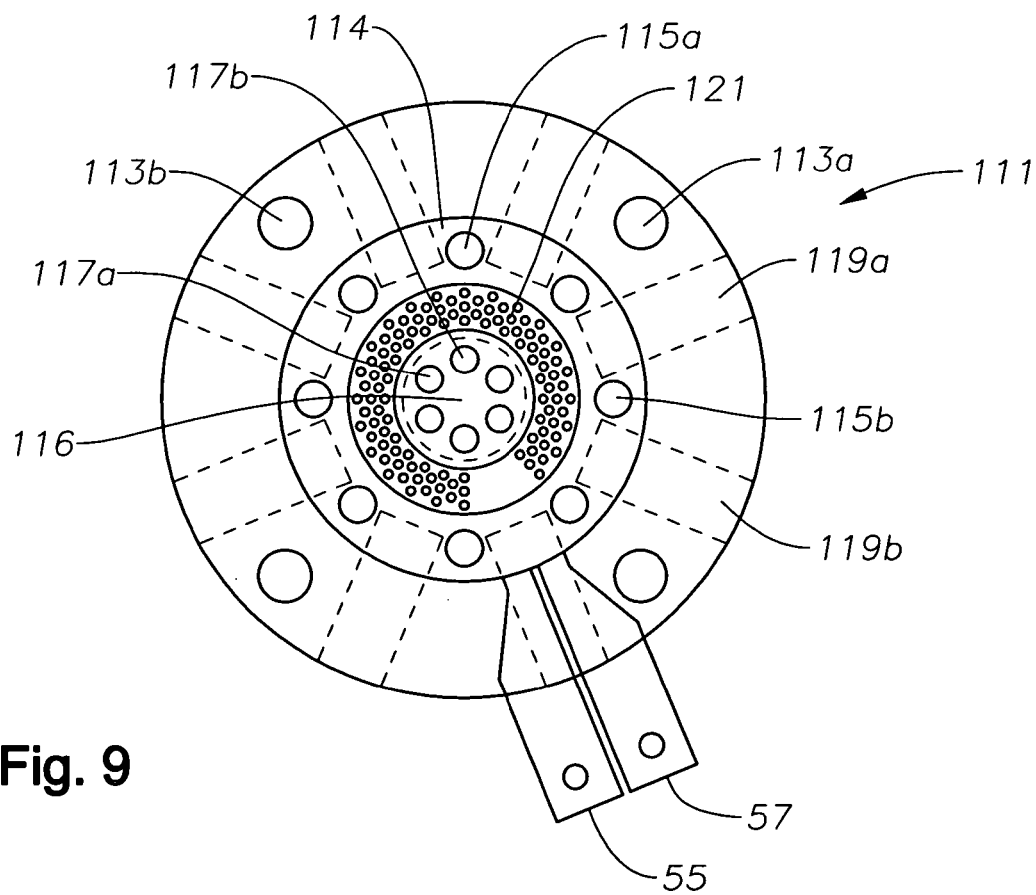
FIG. 9 illustrates another embodiment of a direct-heating die-ring particularly suitable as a retrofit part, which is an aspect of the present invention.

FIG. 9 shows an embodiment of FIG. 5, but illustrating a preferred embodiment of the die ring assembly 111 to provide direct resistive heating to a die plate (e.g., 93 in FIG. 8) according to the present invention. Copper electrodes are illustrated by numerals 55 and 57, as in FIG. 5. Die ring assembly 111 may be bolted to the extruder by means of plural bolt holes 113a, 113b, etc., for mounting. The ring may be fitted around an outer retaining ring 114, bolted to the extruder by bolts 115a, 115b, etc., and an inner retaining ring 116 bolted to the extruder by means of bolts 117a, 117b, etc. The bolts, indicated generally by numerals 113, 115, and 117 typically will be arranged in a pattern concentrically around the central axis of the die plate. Plural cavities 119a, 119b, etc., shown in dotted outline, allow for die plate heaters as previously described (e.g., cavity 85 in FIGS. 6 and 10). Plural capillary openings (each similar to exit 7 in FIG. 8) are shown generally by numeral 121.

Figure 10:
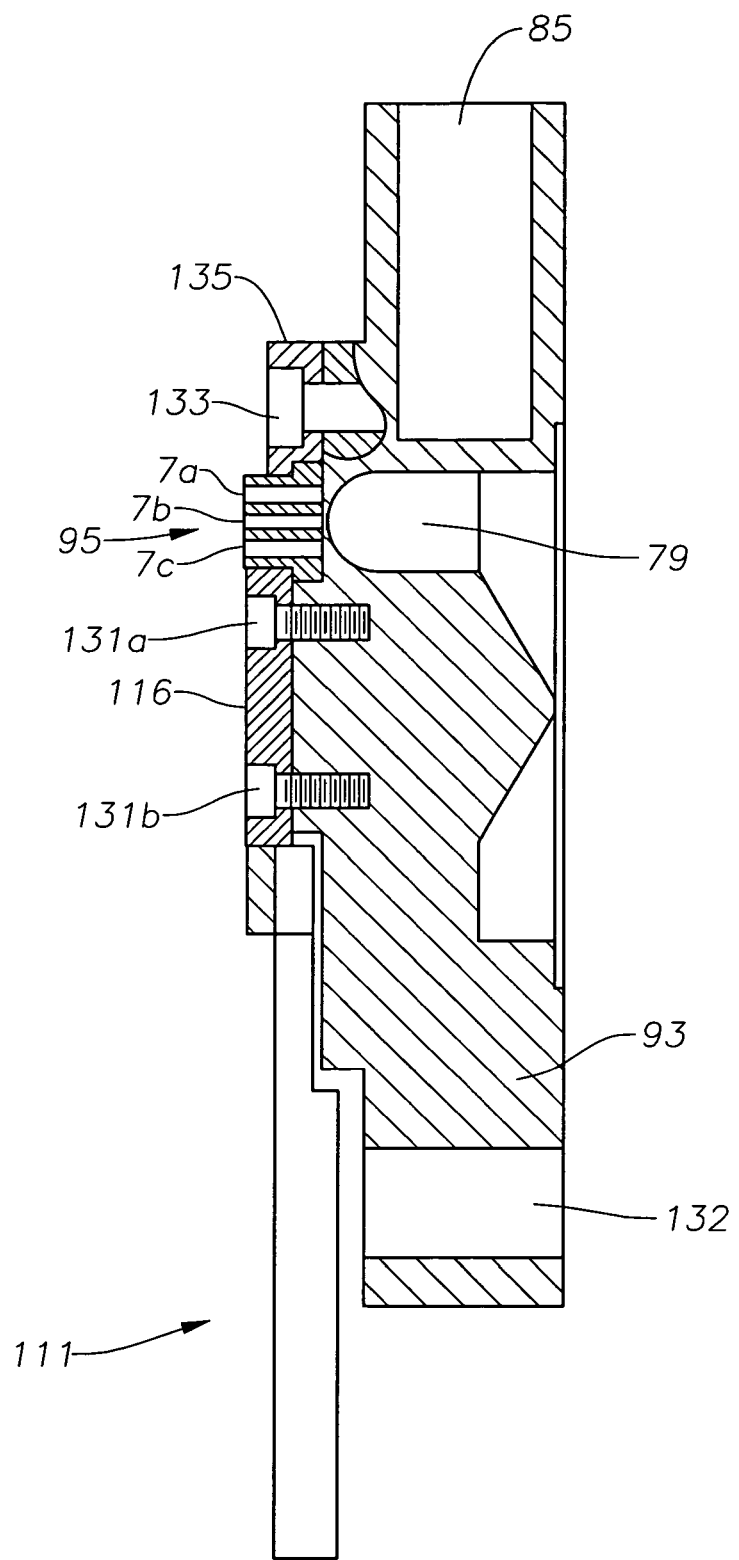
FIG. 10 illustrates a retrofit part according to the present invention.

FIG. 10 is a schematic illustrating the attachment of a die ring 111 as in FIG. 5 or FIG. 9 bolted with bolts 131a and 131b to a die plate 93 at the inner retaining ring 116. Bolt 133 attaches outer retaining ring 135 of the die ring to the die plate. The details of die insert 95 are not shown in this figure, but may be the same as the details shown in FIG. 8. Again, polymer melt enters the channel indicated by 79 and is extruded, in accordance with present invention, out of plural shaping orifices indicated by 7a, 7b, and 7c which comprise the heated die insert 95.

Differences in extrudate smoothness are observed to be principally a function of (a) geometry of the heated part (e.g., position of the heater), (b) the length of the portion of the opening heated, and (c) the temperature to which the exit zone is heated. In underwater testing, both the submerged die length and temperature of the water had a significant effect on the magnitude of heat flux of the die exit region. One of ordinary skill in the art, in possession of the present disclosure, can manipulate the foregoing parameters in order to achieve the objectives of the invention.

There are no significant enhancements observed in SMF performance as a function of the exit configurations. Straight exit, round exit, and counterbore exit are commonly used and may benefit equally from the present invention. Other geometric modifications, such as die tapering, may be employed. Orientation of the capillary outlet, e.g., horizontal or vertical, was not observed to significantly enhance the benefits of the present invention.

An investigation into the effect of the number and arrangement of die openings was conducted using an arrangement of die openings designed to duplicate commercial extruder configurations. Commercial extruders currently use slot-based die plates with one, two, or three rows of die openings per slot. The number of rows of die openings was not observed to affect the outcome and any of the aforementioned variations may be used with any of the commercial extruders regardless of arrangement of die openings.

Regarding the die material, the advantages of the present invention may be seen in dies of numerous materials, such as stainless steel dies, carbon steel dies, ceramic dies, brass dies, and the like. Hardened inserts surrounding the die hole exit (e.g., of tungsten carbide, and the like) may be used.

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

The following details preferred and more preferred embodiments of the invention, which may be combined where applicable, as would be apparent to one of skill in the art in possession of the present disclosure.

An embodiment including an extrusion die assembly comprising at least one die capillary having an initial, upstream zone comprising an opening for receiving a polymer melt having a temperature $T_{melt}$, an intermediate zone for conveying said polymer melt, and a final, downstream zone terminating said extrusion die assembly at an exit opening whereby said polymer melt exits said extrusion die assembly, said zones disposed respectively adjacent each other, and including a heating means for said downstream zone whereby said polymer melt may be locally heated to a temperature greater than $T_{melt}$. While the exact temperature to which this downstream zone is heated to will be determined by routine experimentation, the heating is such that a rheological modification is caused in the polymer layer in contact with the die capillary wall by means of heat. In an example of such a modification, a lower-viscosity layer of polymer material, relative to the bulk polymer characteristic passing through the die, is created by use of a heater to locally heat (or superheat) the die wall and the polymer layer immediately in contact with the wall. In a preferred embodiment the bulk temperature of the polymer stream is relatively unchanged due to the very brief residence time while in contact with the wall-layer polymer. Typically the bulk temperature will not be changed by more than 10° C., preferably not more than 5° C., more preferably not more than 1° C.

Another preferred embodiment of the method described hereinabove includes: a method for extruding a material out of a shaping device having an exit orifice, said material having a bulk temperature at said exit orifice, the improvement comprising heating at least the surface layer of said material proximate said exit orifice to a temperature greater than the bulk temperature of the material at said exit orifice. Another preferred embodiment of the method includes: a method for pelletizing a polymer resin comprising extruding a polymer resin melt through an extrusion die assembly comprising at least one die capillary having a die exit hole, the improvement comprising heating at least a portion of said die capillary so that the temperature of the die exit portion is greater than the temperature of the polymer resin melt.

Either of the aforementioned process embodiments may be further modified by one or more of the following even more preferred embodiments: wherein the temperature of the portion heated proximate the exit opening is about 30-170° C. greater than the temperature of the polymer resin melt; wherein said polymer resin melt does not contain a polymer processing aid; wherein said polymer resin melt comprises polyethylene; wherein said polymer resin melt comprises an mLLDPE; wherein said polymer resin melt comprises an LLDPE; wherein said polymer resin melt comprises an LLDPE having a Melt Index less than or equal to 2.0 dg/min as measure by ASTM Method D-1238; wherein said polymer resin melt comprises an LLDPE having a Melt Index less than or equal to 1.0 dg/min as measure by ASTM Method D-1238; wherein any of the aforementioned polymers, when extruded, according to the method of the invention, and through a 0.125 inch die capillary at 24 kg/hr (per hole) has no visible SMF.

Still another embodiment includes a method of extruding a resin comprising: (a) providing a molten resin product; (b) feeding said product into a shaping device with at least one exit aperture; (c) extruding said product out of said aperture into a quenching media; and (d) selectively heating the exit surface of said aperture to a temperature above the temperature of the extruding product so as to create a thin surface of much lower viscosity at the inner surface wall at the exit of the shaping device; whereby irregular disengagement of the extrudate as it leaves the die aperture is reduced. More preferred embodiments include one or more of the following: wherein the resin is a polymer having an extrusion rate through said shaping device limited by the occurrence of gross surface unevenness on the extruded product; wherein the resin is an mLLDPE resin; wherein the resin is a polyethylene having a Melt Index less than or equal to about 1.0 dg/min as measure by ASTM Method D-1238, Procedure B; wherein the resin is an mLLDPE resin having a Melt Index less than or equal to about 1.0 dg/min as measure by ASTM Method D-1238, Procedure B; wherein said shaping device is a pelletizer selected from the group consisting of an underwater pelletizer, a strand pelletizer, and a water-ring pelletizer; wherein said aperture is selected from the group consisting of: (a) a slit die for extruding sheet; (b) a slit die for extruding film; (c) an annular opening for extruding blown film; and (d) a die for wire and cable coating; wherein an insulation layer is placed between the shaping device and said quenching media (insulation as used herein meaning both thermally and electrically insulating, unless otherwise specified); wherein said heating of the exit surface of the aperture is sufficient to increase the lubricity of the molten resin in the shaping device without raising the bulk temperature of the molten resin; wherein the source of said heating is provided by an integral resistance heater forming the exit portion of the shaping channel; wherein an insulation layer is placed between the exit portion and the cooling media; wherein the source of said heating is an induction heater; wherein the source of said heating is one or more electrical cartridges.

Another preferred embodiment includes the following products of the invention: a shaped article comprising a resin obtainable by the any of the aforementioned processes wherein said shaped article has no visible die-exit surface melt fracture; a shaped article comprising a resin resulting from any of the aforementioned processes, wherein said shaped article having no visible die-exit surface melt fracture; a pellet comprising a resin obtainable by any of the aforementioned processes, said pellet having no visible die-exit surface melt fracture; a pellet comprising a resin resulting from any of the aforementioned processes, said pellet having no visible die-exit surface melt fracture; a shaped article, extrudate, or pellet made by any of the aforementioned processes; and, even more preferred, any of the aforementioned shaped articles, extrudates, or pellets that exhibit no visible SMF when made by any of the foregoing processes including a step of extrusion of the resin through a 0.125 inch capillary die at the rate of 24 kg/hr with or without one or more polymer processing aids. Any of these shaped article, extrudate or pellet embodiments may further include the limitation that the polymer composition comprises, or in the alternative consists essentially of, or in the alternative consists of a mLLDPE having a Melt Index less than or equal to about 1.0 dg/min; a LLDPE having a Melt Index less than or equal to about 1.0 dg/min; a mLLDPE having a Melt Index less than or equal to about 2.0 dg/min; and/or an LLDPE having a Melt Index less than or equal to about 2.0 dg/min (where the Melt Index is measure by ASTM Method D-1238, Procedure B).

Preferred embodiments of the apparatus described hereinabove include: a die plate comprising: (a) an upstream face; (b) a downstream face; (c) at least one passage having a first opening in said upstream face whereby molten resin may be received and a second opening in said downstream face whereby molten resin may be extruded; and (d) a heater proximate said downstream face and proximate with said at least one passage at said downstream opening. Even more preferred embodiments include one or more of the following: wherein said at least one passage is generally cylindrical and having a substantially uniform diameter from said upstream face to said downstream face; wherein said heater is concentric with said at least one passage; wherein said at least one passage passes through a portion of said heater, such that said portion defines the wall of said passage proximate said downstream face; further comprising an insulation material contiguous with said heater and said die plate and concentric with said heater about said at least one passage proximate said downstream opening; further comprising an insulation material concentric with said at least one passage proximate said downstream face and forming at least a portion of said downstream face at said second opening; further comprising an insulation material concentric with said at least one passage and contiguous with at least a portion of said heating means, and contiguous with said at least one passage at said exit opening; wherein said die plate is a monolithic die plate (wherein the term monolithic as used herein means that the part is constructed of one piece, while allowing, for instance, for coatings or impregnations such as the provisions for insulation described herein and placement of electrodes to provide necessary electrical input); wherein said die plate comprises a first plate having said upstream face and a second plate having said downstream face and said heater, said first and second plates fluidically connected by said at least one passage (wherein the term fluidically, as used herein, means that a fluid flowing between the two parts will be relatively unimpeded from part to part); comprising a plurality of said at least one passage; and wherein said die plate comprises a material selected from brass, stainless steel, and Inconel™; wherein said insulation material is selected from high temperature plastics, machineable ceramics, ceramics which may be deposited by spray coating techniques, and ceramics which may be deposited by vapor deposition techniques; wherein said insulation material is selected from high temperature plastics, machineable ceramics, ceramics which may be deposited by spray coating techniques, and ceramics which may be deposited by vapor deposition techniques.

Another preferred embodiment of the apparatus is: an extrusion die assembly comprising a die plate having at least one passage including an initial, upstream zone comprised of an opening for receiving a polymer melt having a bulk temperature $T_{melt}$, an intermediate zone for conveying said polymer melt, and a final, downstream zone terminating said extrusion die assembly at an exit opening whereby said polymer melt exits said extrusion die assembly, further comprising a heating means for said downstream zone whereby at least a portion of said polymer melt may be locally heated to a temperature greater than $T_{melt}$; and also includes more preferred embodiments such as wherein said heating means comprises a heater concentric with the extrusion orifice pattern; wherein said heating means is proximate said exit opening; wherein said downstream zone further comprising an insulation material concentric with said passage and contiguous with at least a portion of said heating means and said die assembly; wherein said downstream zone further comprises an insulation material concentric with said passage and contiguous with at least a portion of said heating means, and contiguous with said passage at said exit opening; wherein said passage is generally cylindrical and having a substantially uniform diameter from said opening for receiving a polymer melt to said exit opening; wherein said die plate comprises a plurality of said at least one passage; wherein said die plate is a monolithic die plate; wherein said die plate comprises a first plate having an upstream face and comprising said upstream zone and a second plate having a downstream face and said heater, said first and second plates fluidically connected by said at least one passage; wherein said die plate comprises a plurality of said at least one passage; comprising a plurality of said at least one passage and wherein said first and second plates are fluidically connected by each of said at least one passage; wherein said die plate comprises a material selected from brass, stainless steel, and Inconel™; wherein said insulation material is selected from high temperature plastics, machineable ceramics, ceramics which may be deposited by spray coating techniques, and ceramics which may be deposited by vapor deposition techniques; wherein said insulation material is selected from high temperature plastics, machineable ceramics, ceramics which may be deposited by spray coating techniques, and ceramics which may be deposited by vapor deposition techniques; wherein said second plate is a retrofit part.

Yet still another preferred embodiment of the apparatus includes: a monolithic heater for retrofitting a resin shaping apparatus having at least one extrusion die orifice, said heater having a first face to engage said at least one extrusion die orifice of said resin shaping apparatus and a second face opposite said first face, at least one passage between said first and second faces and substantially mating said at least one extrusion die orifice, whereby said orifice and said passage are fluidically connected and whereby a molten material passing out of said at least one extrusion die orifice may be heated by passing through said passage of said monolithic heater, and means to provide electrical energy to said monolithic heater; and also more preferred embodiments including an insulation material on said second face; a plurality of said at least one passage; wherein said heater material is selected from brass, stainless steel, and Inconel™; wherein said insulation is selected from high temperature plastics, machineable ceramics, ceramics which may be deposited by spray coating techniques, and ceramics which may be deposited by vapor deposition techniques; wherein said heater having a generally circular perimeter and a void generally in the center defining an inner diameter of said heater, said heater having a plurality of at least one passage, wherein the thickness of the heater between said first face and said second face is tapered to reduce the thickness progressively toward the inner diameter.

Yet still another preferred embodiment includes an extrusion die assembly comprising an extrusion die having a plurality of extrusion orifices and the monolithic heater as set forth above, said monolithic heater having a plurality of extrusion orifices fluidically engaged with a plurality of extrusion orifices in said extrusion die.

We claim:

1. A die plate comprising:
   (a) an upstream face;
   (b) a downstream face;
   (c) at least one passage having a first opening in said upstream face whereby molten resin at bulk temperature $T_{melt}$ may be received and a second exit opening in said downstream face whereby molten resin may be extruded; and
   (d) a heater at the exit opening in said downstream face and proximate with said at least one passage in said downstream face and capable of locally heating said molten resin to a temperature from about 245° C. to about 372° C., the local molten resin temperature being from 30-170° C. above bulk temperature $T_{melt}$.

2. The die plate according to claim 1, wherein said at least one passage is generally cylindrical and having a substantially uniform diameter from said upstream face to said downstream face.

3. The die plate according to claim 1, wherein said heater is concentric with said at least one passage.

4. The die plate according to claim 1, wherein said at least one passage passes through a portion of said heater, such that said portion defines the wall of said passage proximate said downstream face.

5. The die plate according to claim 1, further comprising an insulation material concentric with said at least one passage proximate said downstream face and forming at least a portion of said downstream face at said second opening.

6. The die plate according to claim 1, further comprising an insulation material concentric with said at least one passage and contiguous with at least a portion of said heater, and contiguous with said at least one passage at said exit opening.

7. The die plate according to claim 1, wherein said die plate is a monolithic die plate.

8. The die plate according to claim 1, wherein said die plate comprises a first plate having said upstream face and a second plate having said downstream face and said heater, said first and second plates fluidically connected by said at least one passage.

9. The die plate according to claim 8, comprising a plurality of said at least one passage and wherein said first and second plates are fluidically connected by each of said at least one passage.

10. The die plate according to claim 1, comprising a plurality of said at least one passage.

11. The die plate according to claim 5, wherein said insulation material is selected from high temperature plastics, machineable ceramics, ceramics which may be deposited by spray coating techniques, and ceramics which may be deposited by vapor deposition techniques.

12. The die plate according to claim 6, wherein said insulation material is selected from high temperature plastics, machineable ceramics, ceramics which may be deposited by spray coating techniques, and ceramics which may be deposited by vapor deposition techniques.

13. An extrusion die assembly comprising a die plate for preparing pellets having at least one passage including an initial, upstream zone having an opening for receiving a polymer melt having a bulk temperature $T_{melt}$, an intermediate zone for conveying said polymer melt, and a final, downstream zone terminating said extrusion die assembly at an exit opening whereby said polymer melt exits said extrusion die assembly, further comprising a heating means for said downstream zone at the exit opening whereby at least a portion of said polymer melt may be locally heated to a temperature from about 245° C. to about 372° C., the local molten resin temperature being from 30-170° C. above bulk temperature $T_{melt}$.

14. The extrusion die assembly according to claim 13, the extrusion die further comprising a plurality of extrusion orifices forming a pattern, wherein said heating means comprises a heater concentric with the extrusion orifice pattern.

15. The extrusion die assembly according to claim 13, wherein said heating means is proximate said at least one passage.

16. The extrusion die assembly according to claim 13, wherein said downstream zone further comprises an insulation material concentric with said passage and contiguous with at least a portion of said heating means and said die assembly.

17. The extrusion die assembly according to claim 13, wherein said downstream zone further comprises an insulation material concentric with said passage and contiguous with at least a portion of said heating means, and contiguous with said passage at said exit opening.

18. The extrusion die assembly according to claim 13, wherein said passage is generally cylindrical and having a substantially uniform diameter from said opening for receiving a polymer melt to said exit opening.

19. The extrusion die assembly according to claim 13, wherein said die plate comprises a plurality of said at least one passage.

20. The extrusion die assembly according to claim 13, wherein said die plate is a monolithic die plate.

21. The extrusion die assembly according to claim 13, wherein said die plate comprises a first plate having an upstream face and comprising said upstream zone and a second plate having a downstream face and wherein said heating means, said first plate, and second plate are fluidically connected by said at least one passage.

22. The extrusion die assembly according to claim 21, comprising a plurality of said at least one passage and wherein said first and second plates are fluidically connected by each of said at least one passage.

23. The extrusion die assembly according to claim 16, wherein said insulation material is selected from high temperature plastics, machineable ceramics, ceramics which may be deposited by spray coating techniques, and ceramics which may be deposited by vapor deposition techniques.

24. The extrusion die assembly according to claim 17, wherein said insulation material is selected from high temperature plastics, machineable ceramics, ceramics which may be deposited by spray coating techniques, and ceramics which may be deposited by vapor deposition techniques.

25. An extrusion die assembly comprising an extrusion die for preparing pellets having a plurality of extrusion orifices and a monolithic heater for retrofitting a resin shaping apparatus having at least one extrusion die orifice, said heater having a first face to engage said at least one extrusion die orifice of said resin shaping apparatus and a second face opposite said first face, one or more passages between said first and second faces and substantially mating said at least one extrusion die orifice, wherein said orifice and said one or more passages are fluidically connected, and wherein a molten material at $T_{melt}$ passing out of said at least one extrusion die orifice is locally heated to a temperature from about 245° C. to about 372° C., the local molten material temperature being from 30-170° C. above $T_{melt}$ by passing through said one or more passages of said monolithic heater, said heater comprising a plurality of said one or more passages, wherein said plurality of extrusion orifices are fluidically engaged with said plurality of said one or more passages in said monolithic heater.

26. A die plate comprising:
 (a) an upstream face;
 (b) a downstream face;
 (c) at least one passage having a first opening in said upstream face whereby molten resin at bulk temperature $T_{melt}$ may be received and a second exit opening in said downstream face whereby molten resin may be extruded; and
 (d) an electrical heating element proximate said downstream face and proximate with said at least one passage and at the exit opening in said downstream face, wherein said electrical heating element is capable of locally heating said molten resin by direct contact of said molten resin with said electrical heating element.

27. The die plate according to claim 26, wherein said at least one passage passes through a portion of said heater, such that said portion defines the wall of said passage proximate said downstream face.

28. The die plate according to claim 26, wherein said die plate is a monolithic die plate.

29. The die plate according to claim 26, wherein said die plate comprises a first plate having said upstream face and a second plate having said downstream face and said heater, said first and second plates fluidically connected by said at least one passage.

30. The die plate according to claim 26, wherein said die plate comprises a material selected from brass, stainless steel, and nickel steel.

31. An extrusion die assembly comprising a die plate for preparing pellets having at least one passage including an initial, upstream zone having an opening for receiving a polymer melt having a bulk temperature $T_{melt}$, an intermediate zone for conveying said polymer melt, and a final, downstream zone terminating said extrusion die assembly at an exit opening whereby said polymer melt exits said extrusion die assembly, further comprising an electrical heating means at the exit opening for said downstream zone whereby at least a portion of said polymer melt would be locally heated by direct contact of said polymer melt with said electrical heating means.

32. The extrusion die assembly according to claim 31, wherein said heating means is proximate said at least one passage.

33. The extrusion die assembly according to claim 31, wherein said die plate is a monolithic die plate.

34. The extrusion die assembly according to claim 31, wherein said die plate comprises a first plate having an upstream face and comprising said upstream zone and a second plate having a downstream face and wherein said heating means, said first plate, and second plate are fluidically connected by said at least one passage.

35. The extrusion die assembly according to claim 31, wherein said die plate comprises a material selected from brass, stainless steel, and nickel steel.

36. The extrusion die of claims 1 or 13 wherein said die plate comprises a material selected from brass, stainless steel, and nickel steel.

37. The extrusion die of claim 1, further comprising an insulation material contiguous with said heater and said die plate and concentric with said heater about said at least one passage proximate said downstream face.

38. The extrusion die of claims 26 or 31 wherein said insulation material is selected from high temperature plastics, machineable ceramics, ceramics which may be deposited by spray coating techniques, and ceramics which may be deposited by vapor deposition techniques.

39. The extrusion die of claim 31, wherein said downstream zone further comprises an insulation material concentric with said passage and contiguous with at least a portion of said heating means and said die assembly.

40. The extrusion die of claim 13, further comprising an insulation material contiguous with said heating means and said die plate and concentric with said heater about said at least one passage proximate said downstream face.

41. The extrusion die of claim 26, further comprising an insulation material contiguous with said heating element and said die plate and concentric with said heater about said at least one passage proximate said downstream face.

* * * * *

UNITED STATES PATENT AND TRADEMARK OFFICE
CERTIFICATE OF CORRECTION

PATENT NO. : 7,632,086 B2 Page 1 of 1
APPLICATION NO. : 10/723389
DATED : December 15, 2009
INVENTOR(S) : Veariel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this

Second Day of November, 2010

David J. Kappos
*Director of the United States Patent and Trademark Office*